United States Patent
Wang et al.

(10) Patent No.: US 10,210,645 B2
(45) Date of Patent: Feb. 19, 2019

(54) ENTITY AGNOSTIC ANIMATION TOOL

(71) Applicant: Apple Inc., Cupertino, CA (US)

(72) Inventors: Norman N. Wang, San Jose, CA (US); Jacques P. Gasselin de Richebourg, Sunnyvale, CA (US); Ross R. Dexter, San Jose, CA (US); Tyler L. Casella, San Jose, CA (US)

(73) Assignee: Apple Inc., Cupertino, CA (US)

( * ) Notice: Subject to any disclaimer, the term of this patent is extended or adjusted under 35 U.S.C. 154(b) by 66 days.

(21) Appl. No.: 14/732,736

(22) Filed: Jun. 7, 2015

(65) Prior Publication Data

US 2016/0358366 A1    Dec. 8, 2016

(51) Int. Cl.
*G06T 13/00* (2011.01)
*G06T 13/20* (2011.01)

(52) U.S. Cl.
CPC .......... *G06T 13/00* (2013.01); *G06T 2200/24* (2013.01); *G06T 2213/08* (2013.01); *G06T 2213/12* (2013.01)

(58) Field of Classification Search
CPC ................................ G06T 13/40; G06T 13/20
USPC ......................................................... 345/474
See application file for complete search history.

(56) References Cited

U.S. PATENT DOCUMENTS

| | | | | |
|---|---|---|---|---|
| 5,880,731 A | * | 3/1999 | Liles | .................... H04L 12/1827 345/473 |
| 6,404,438 B1 | * | 6/2002 | Hatlelid | .................. G06F 3/033 345/473 |
| 7,165,212 B2 | | 1/2007 | Faraday | |
| 7,692,657 B2 | | 4/2010 | Gauthier | |
| 8,884,971 B2 | | 11/2014 | Mandal | |
| 8,937,620 B1 | * | 1/2015 | Teller | ...................... G06T 13/80 345/467 |
| 2005/0071306 A1 | * | 3/2005 | Kruszewski | ............ A63F 13/10 706/47 |
| 2006/0259869 A1 | | 11/2006 | Hewitt | |

(Continued)

OTHER PUBLICATIONS

Cubecraft, "Blender Tutorial—Creating and Editing Actions for Re-use in Animations and Games", publish on youtube.com on Jun. 18, 2013, https://www.youtube.com/watch?v=Gb152Qncn2s.*

*Primary Examiner* — Jin Ge
(74) *Attorney, Agent, or Firm* — Blank Rome LLP

(57) ABSTRACT

This disclosure relates generally to the field of image processing and, more particularly, to various techniques and animation tools for allowing 2D and 3D graphics rendering and animation infrastructures to be able to dynamically render customized animations—without the need for the customized animations to be explicitly tied to any particular graphical entity. These so-called entity agnostic animations may then be integrated into "mixed" graphical scenes (i.e., scenes with both two-dimensional and three-dimensional components), where they may be: applied to any suitable graphical entity; visualized in real-time by the programmer; edited dynamically by the programmer; and shared across various computing platforms and environments that support the entity agnostic animation tools described herein. The entity agnostic animations created by the techniques described herein may be output directly to the current scene file that a programmer is working on, or they may be output to standalone, reusable entity agnostic animation object files.

20 Claims, 10 Drawing Sheets

(56) References Cited

U.S. PATENT DOCUMENTS

| | | | |
|---|---|---|---|
| 2007/0159487 A1* | 7/2007 | Felt | G06T 13/80 345/474 |
| 2008/0018792 A1* | 1/2008 | Bhat | G06T 13/40 348/578 |
| 2010/0088624 A1 | 4/2010 | Bligh | |
| 2012/0001924 A1* | 1/2012 | Richardson | G06T 13/80 345/473 |
| 2012/0081382 A1* | 4/2012 | Lindahl | G06T 11/00 345/581 |
| 2012/0237088 A1* | 9/2012 | Bekaert | G06T 17/05 382/113 |
| 2012/0256928 A1* | 10/2012 | Chiculita | G06T 13/20 345/473 |
| 2013/0246063 A1* | 9/2013 | Teller | G10L 13/033 704/235 |
| 2015/0002516 A1* | 1/2015 | Frederickson | G06T 13/40 345/474 |

* cited by examiner

ENTITY AGNOSTIC ANIMATION TOOL

BACKGROUND

This disclosure relates generally to the field of image processing and, more particularly, to various techniques and animation tools for allowing 2D and 3D graphics rendering and animation infrastructures to be able to dynamically render customized animations—without the need for the customized animations to be explicitly tied to any particular graphical entity. These animations, referred to herein as "entity agnostic" animations, may then be integrated into "mixed" graphical scenes (i.e., scenes with both two-dimensional and three-dimensional components), where they may be applied to any suitable graphical entity (e.g., a sprite, button, box, or other graphical object), visualized in real-time by the programmer, edited dynamically by the programmer, and shared across various computing platforms and environments that have support for the entity agnostic animation tools described herein.

Graphics rendering and animation infrastructures are commonly used by programmers today and provide a convenient means for rapid application development, such as for the development of gaming applications on mobile devices. Because graphics rendering and animation infrastructures may utilize the graphics hardware available on the hosting device to composite 2D, 3D, and mixed 2D and 3D scenes at high frame rates, programmers can create and use complex animations, "special effects," texture atlases, etc., in games and other application with limited programming overhead.

For example, Sprite Kit, developed by APPLE INC., provides a graphics rendering and animation infrastructure that programmers may use to animate arbitrary textured two-dimensional images, or "sprites." Sprite Kit uses a traditional rendering loop, whereby the contents of each frame are processed before the frame is rendered. Each individual game determines the contents of the scene and how those contents change in each frame. Sprite Kit then does the work to render the frames of animation efficiently using the graphics hardware on the hosting device. Sprite Kit is optimized so that the positions of sprites may be changed arbitrarily in each frame of animation.

Sprite Kit supports many different kinds of content, including: untextured or textured rectangles (i.e., sprites); text; arbitrary CGPath-based shapes; and video. Sprite Kit also provides support for cropping and other special effects. Because Sprite Kit supports a rich rendering infrastructure and handles all of the low-level work to submit drawing commands to OpenGL, the programmer may focus his or her efforts on solving higher-level design problems and creating great gameplay. The "Sprite Kit Programming Guide" (last updated Sep. 17, 2014) is hereby incorporated by reference in its entirety.

Three-dimensional graphics rendering and animation infrastructures are also commonly used by programmers today and provide a convenient means for developing applications with complex three-dimensional graphics, e.g., gaming applications using three-dimensional characters and/or environments. For example, Scene Kit, developed by APPLE INC., provides an Objective-C framework for building applications and games that use 3D graphics, combining a high-performance rendering engine with a high-level, descriptive API. Scene Kit supports the import, manipulation, and rendering of 3D assets. Unlike lower-level APIs, such as OpenGL, which require programmers to implement in precise detail the rendering algorithms that display a scene, Scene Kit only requires descriptions of the scene's contents and the actions or animations that the programmers want the objects in the scene to perform.

The Scene Kit framework offers a flexible, scene graph-based system to create and render virtual 3D scenes. With its node-based design, the Scene Kit scene graph abstracts most of the underlying internals of the used components from the programmer. Scene Kit does all the work underneath that is needed to render the scene efficiently using all the potential of the GPU. The "Scene Kit Programming Guide" (last updated Jul. 23, 2012) is hereby incorporated by reference in its entirety.

Finally, Core Animation, developed by APPLE INC., provides programmers with a graphics rendering and animation infrastructure available on both iOS and OS X that may be used to animate the views and other visual elements within an application (i.e., "app"). With Core Animation, most of the work required to draw each frame of an animation is done for the programmer automatically. All that the programmer has to do is configure a few animation parameters (such as the start and end points) and tell Core Animation to start. Core Animation then does the rest of the animation automatically, handing most of the actual drawing work off to the device's onboard graphics hardware to accelerate the rendering. This automatic graphics acceleration results in high frame rates and smooth animations without burdening the CPU and slowing down the app's operation. The "Core Animation Programming Guide" (last updated Mar. 9, 2015) is hereby incorporated by reference in its entirety.

As mentioned above, what is needed in order to provide greater functionality, efficiency, and interoperability between the aforementioned animation frameworks (or similar animation frameworks) is a tool for visualizing, creating, and manipulating asynchronous (and/or synchronous) animation actions on any number of graphical entities within a 2D, 3D, or "mixed" scene environment that is: dynamic, visual, entity-agnostic, and easy to modify, save, and share with other programmers.

SUMMARY

Methods, computer readable media, and systems for allowing 2D and 3D graphics rendering and animation infrastructures to be able to dynamically visualize, create, and manipulate entity agnostic animation effects on entities in "mixed" scenes (i.e., scenes with both two-dimensional and three-dimensional graphical components)—without the need for using key frames and without regard for the particular entity (or type of entity) being animated—are described herein. Because the entity agnostic animations described herein are not key frame-based, so all the logic for the entities are defined in terms of movements, and a unique data set and structure is provided herein to describe these movements. Further, because key frames are not employed, the duration of an action can be arbitrary. By defining an entry behavior and exit behavior, the overall movement may be defined without needing to use key frames.

The inventors have realized new and non-obvious ways of visualizing, creating, and manipulating asynchronous (and/or synchronous) animation actions on any number of graphical entities within a 2D, 3D, or "mixed" scene environment. According to some embodiments, the animations are "entity agnostic," meaning that the information encoding the animation is decoupled from the entity that the animation is being used to animate. This allows for the same animation to be easily reused and applied to any number of graphical entities. This approach also allows changes to an underlying entity agnostic animation object to be immediately and seamlessly applied to any graphical entity utilizing the animation object.

The entity agnostic animation tool disclosed herein also provides a user interface visualization presenting the individual component actions of an animation along a series of "tracks" or "sequences." Each track within the visualization represents a sequential flow of repeatable actions performed asynchronously with all tracks. Multiple tracks may be combined together into "groups." This approach allows each behavioral component of a complex entity animation to be easily visualized and edited by users. In addition, the entity agnostic animation tool disclosed herein allows for complex behavior creation within a user-defined environment, which is helpful in coordinating behaviors between multiple entities of a scene.

Thus, in one embodiment disclosed herein, a non-transitory program storage device, readable by a programmable control device, may comprise instructions stored thereon to cause one or more processing units to: obtain a scene file having one or more entity objects and a plurality of animation action objects uniquely associated with each entity object; identify a first entity and a first collection of animation action objects, wherein the first collection of animation action objects includes all of the animation action objects associated with the first entity; display a window having a first portion and a second portion, wherein the second portion is separate from the first portion; display a representation of the first entity object in the first portion of the window; display, a representation of a first series of temporally non-overlapping animation action objects from the first collection of animation action objects in a first track in the second portion of the window; generate a first action file that includes the first collection of animation action objects and not the first entity object; and store the first action file in a non-transitory memory.

In still other embodiments, the techniques described herein may be implemented as methods or in apparatuses and/or systems, such as electronic devices having memory and programmable control devices.

DETAILED DESCRIPTION

Systems, methods and program storage devices are disclosed, which cause one or more processing units to dynamically create, visualize, manipulate, customize, and store "entity agnostic" animations for 2D and 3D graphical entities in a scene—without the need for the customized animations to be explicitly tied to any particular graphical entity. The techniques disclosed herein are applicable to any number of electronic devices with displays: such as digital cameras, digital video cameras, mobile phones, personal data assistants (PDAs), portable music players, monitors, and, of course, desktop, laptop, and tablet computer displays.

In the following description, for purposes of explanation, numerous specific details are set forth in order to provide a thorough understanding of the inventive concept. As part of this description, some of this disclosure's drawings represent structures and devices in block diagram form in order to avoid obscuring the invention. In the interest of clarity, not all features of an actual implementation are described in this specification. Moreover, the language used in this disclosure has been principally selected for readability and instructional purposes, and may not have been selected to delineate or circumscribe the inventive subject matter, resort to the claims being necessary to determine such inventive subject matter. Reference in this disclosure to "one embodiment" or to "an embodiment" means that a particular feature, structure, or characteristic described in connection with the embodiment is included in at least one implementation of the invention, and multiple references to "one embodiment" or "an embodiment" should not be understood as necessarily all referring to the same embodiment.

It will be appreciated that, in the development of any actual implementation (as in any development project), numerous decisions must be made to achieve the developers' specific goals (e.g., compliance with system- and business-related constraints), and that these goals may vary from one implementation to another. It will also be appreciated that such development efforts might be complex and time-consuming, but would nevertheless be a routine undertaking for those of ordinary skill in the design of an implementation of image processing systems having the benefit of this disclosure.

Figure 1A:
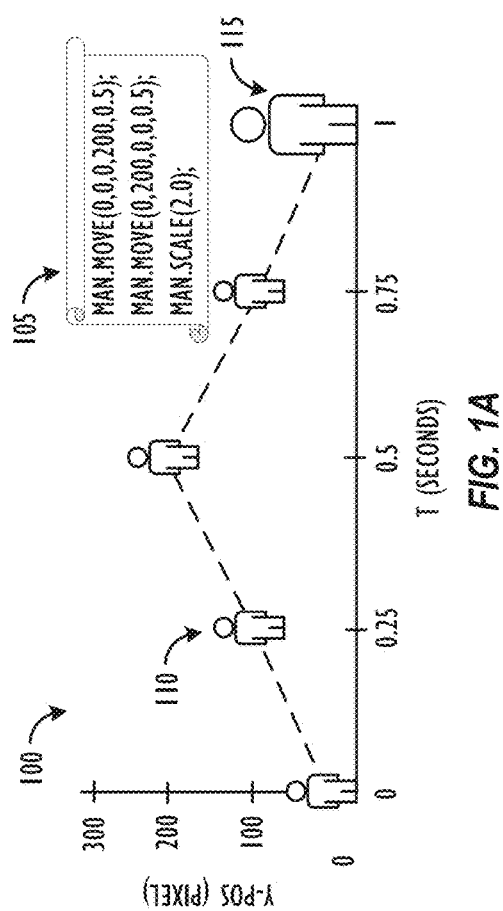
FIGS. 1A and 1B illustrate a first exemplary non-entity agnostic animation being applied to different respective graphical entities.
Figure 1B:
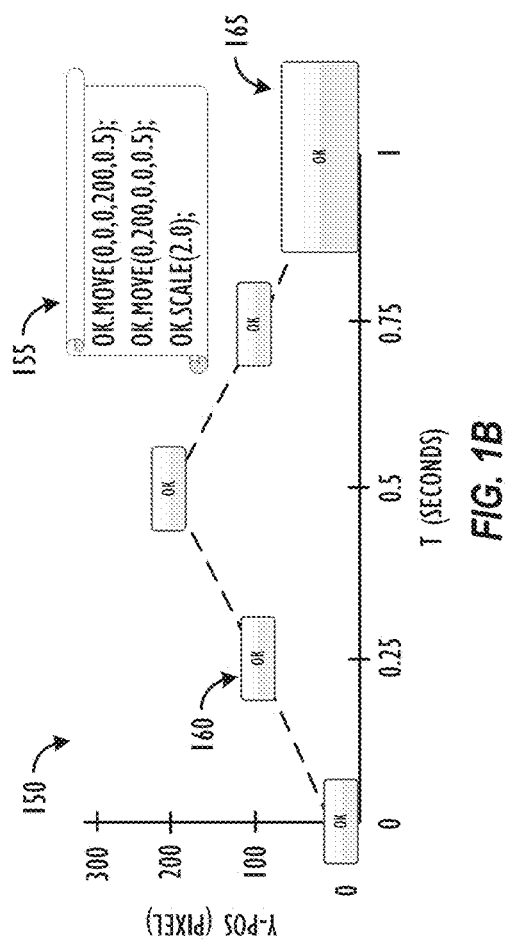

Referring now to FIGS. 1A and 1B, a first exemplary non-entity agnostic animation being applied to different respective graphical entities 100/150 is illustrated. As shown in FIG. 1A, a code routine 105 has been written to move and scale an exemplary graphical entity, i.e., "Man" sprite 100, according to specified parameters. More specifically, in the example of FIG. 1A, the code routine 105 has particularly been written to: move entity 100 up by 200 pixels in a y-direction of a defined coordinate space over a span of 0.5 seconds; and then move entity 100 down by 200 pixels in the y-direction of the defined coordinate space over a span of a subsequent 0.5 seconds; and then, finally, scale entity 100 by a factor of 2.0×. [Of course, these commands are merely exemplary, and any number of possible commands and parameters available in a given animation framework could be used to animate the entity according to a desired routine.]

As is illustrated in FIG. 1A, the y-axis of the graph refers to the y-coordinate pixel position of entity "Man" 100, and the x-axis of the graph represents the passage of time. Thus, although it looks as though the entity 100 is moving from left to right across the page (and, by extension, in the game or app), the x-coordinate of entity 100 is actually static in this particular exemplary illustration, and the movement across the x-axis from left to right is used to represent the y-position of entity 100 over the passage of time instead. Thus, as may now be more fully understood, at time t=0 s, the entity 100 is at a position of (0,0); at time t=0.25 s, the entity 100 is at a position of (0,100) (see position 110) at time t=0.5 s, the entity 100 is at a peak height position of (0,200); at time t=0.75, the entity 100 has begun to descend again and is at a position of (0,100) again; and finally, at time t=1.0 s, the entity 100 has returned to position of (0,0) and has doubled in size (see position 115). For these reasons, the exemplary animation simulates "Man" 100 jumping up and down and then growing in size, and so will be referred to herein as a "BIG_JUMP" animation. This exemplary animation is described as being non-entity agnostic because the code routine 105 has been written specifically for entity "Man" 100, and only lives in the current "scene" file that entity "Man" 100 is a part of. As will be shown with respect to FIG. 1B, the same animation path taken by the entity "Man" 100 in FIG. 1A may not be readily modified, visualized, shared with other programs, or applied to other entities.

Turning now to FIG. 1B, a code routine 155 is shown that has been written to move and scale an exemplary graphical entity, i.e., "OK Button" sprite 150, according to specified parameters. More specifically, as with the example of FIG. 1A, the code routine 155 has particularly been written to: move the "OK Button" entity 150 up by 200 pixels in a y-direction of a defined coordinate space over a span of 0.5 seconds; and then move entity 150 down by 200 pixels in the y-direction of the defined coordinate space over a span of a subsequent 0.5 seconds; and then, finally, scale entity 150 by a factor of 2.0×. This exemplary animation is also described as being non-entity agnostic because the code routine 155 has been written specifically for entity "OK Button" 150, and only lives in the current "scene" file that entity "OK Button" 150 is a part of. The same animation path taken by the entity "OK Button" 150 in FIG. 1B may not be readily modified, visualized, shared with other programs, or applied to other entities. As may now be appreciated, despite having the same animations being applied to them (i.e., the "BIG_JUMP" set of animations), entity 100 and entity 150 in FIGS. 1A and 1B, respectively, each require an individual, entity-specific animation routine (e.g., code routines 105 and 155, respectively) to be written for them within their scene files. Thus, it would be desirable if the animation routines could be decoupled from the particular graphical entities that they are being applied to, so that changes to the animation routines could be visualized more easily, globally modified and updated, and re-used within scenes and across disparate programs and editors with ease.

Figure 2A:
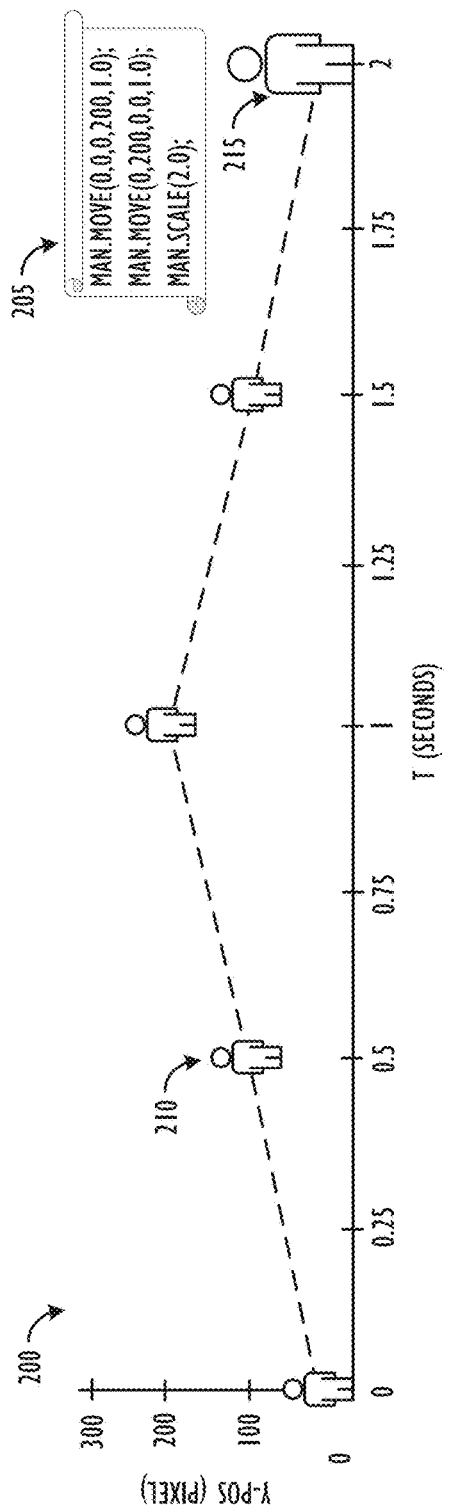
FIGS. 2A and 2B illustrate a second exemplary non-entity agnostic animation being applied to different respective graphical entities.
Figure 2B:
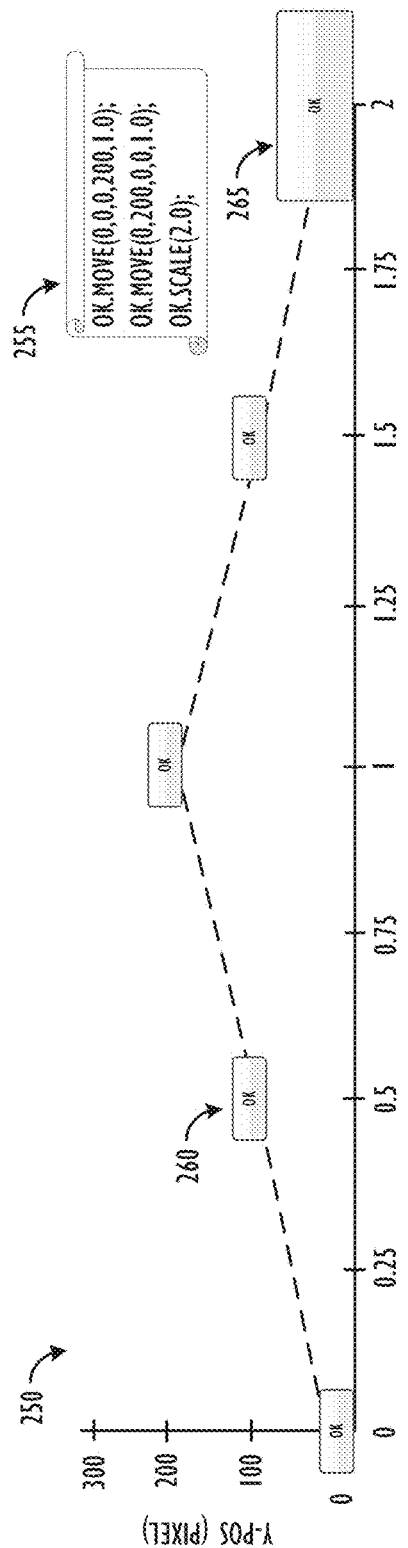

Referring now to FIGS. 2A and 2B, a second exemplary non-entity agnostic animation being applied to different respective graphical entities 200/250 is illustrated. The only difference between the examples of FIGS. 2A and 2B and the examples of FIGS. 1A and 1B is that, in the examples of FIGS. 2A and 2B, the "BIG_JUMP" routine is designed to take 2.0 seconds to complete, rather than 1.0 seconds. Accordingly, the positions (e.g., positions 210/215 of entity 200 and positions 260/265 of entity 250) are time-scaled accordingly with respect to the corresponding positions shown in FIGS. 1A and 1B (e.g., positions 110/115 of entity 100 and positions 160/165 of entity 150), based on the doubled time duration of the animation. For example, entities 200/250 reach their peak heights of 200 pixels at the 1.0 second time mark in FIGS. 2A and 2B, as opposed to at the 0.5 second mark in FIGS. 1A and 1B. Thus, FIGS. 2A and 2B serve to further illustrate the point that additional code routines 205/255 had to be custom written and stored for the "2 second" versions of the "BIG_JUMP" animation that was first introduced in FIGS. 1A and 1B as a "1 second" long animation. Since the animations of entities 205/255 could be represented as simply a "time-scaled" version of the animations of entities 105/155 (i.e., time-scaled by a factor of 2×) this scenario further illustrates the need for animation routines that can be decoupled from the particular graphical entities and time-scales that they are being applied to, so that changes to the animation routines and/or time-scales may be visualized more easily, globally modified and updated, and re-used within scenes and across disparate programs and editors with ease.

Figure 3:
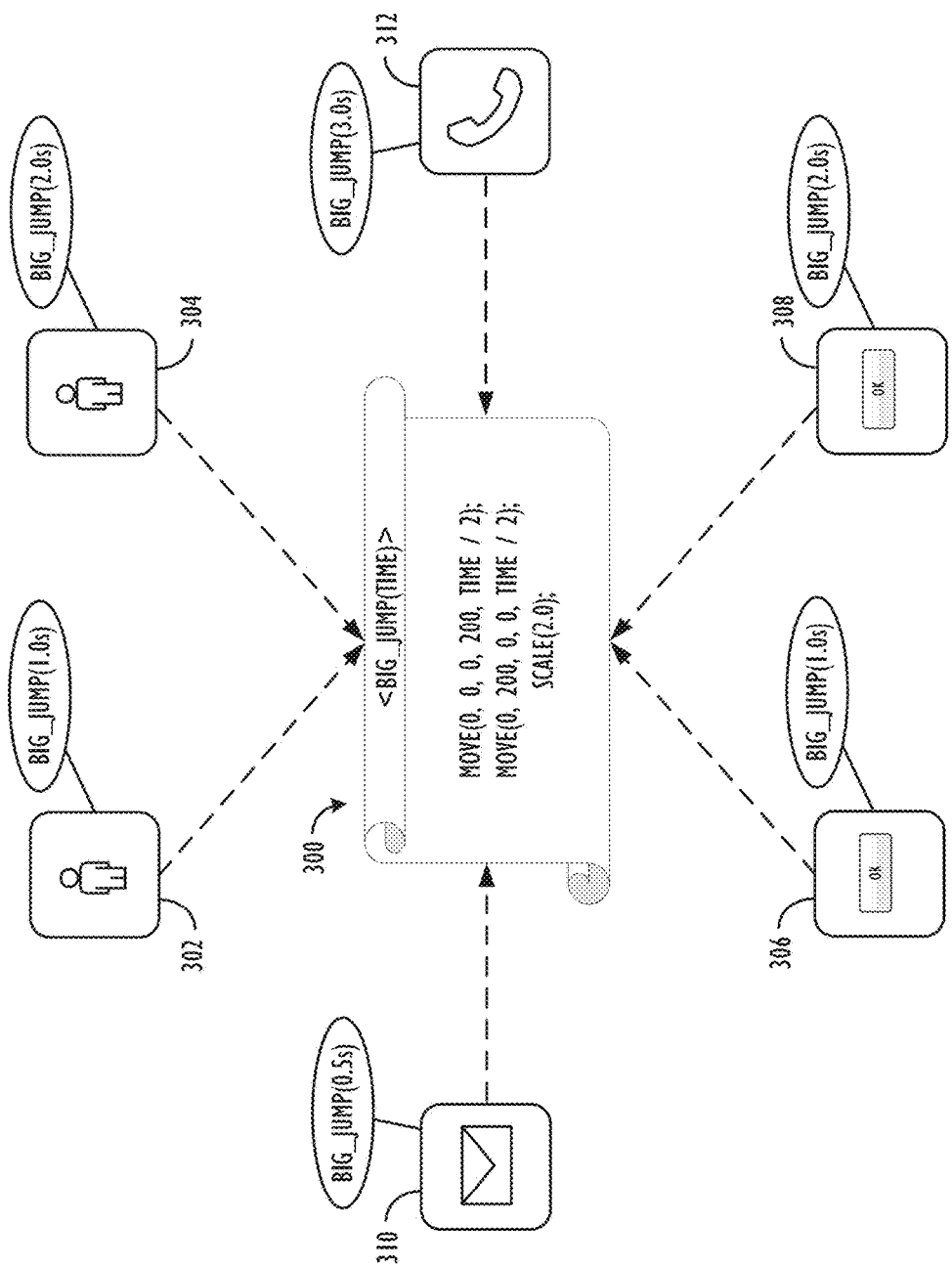
FIG. 3 illustrates an exemplary entity agnostic animation object, in accordance with some embodiments.

Referring now to FIG. 3, an exemplary entity agnostic animation object 300 is illustrated, in accordance with some embodiments. As shown in FIG. 3, the entity agnostic animation object 300 represents the particular animations involved in the "BIG_JUMP" animation discussed above with respect to FIGS. 1 and 2. Like the animations discussed above with respect to FIGS. 1 and 2, the entity agnostic version of the "BIG_JUMP" animation moves an entity up 200 pixels in half of an input time duration (i.e., "(TIME)"), then moves the entity down 200 pixels in half of the input time duration, and then scales the entity by a factor of 2.0×. As shown in FIG. 3, many different graphical entity may use the entity agnostic version of the "BIG_JUMP" animation, e.g., the "Man" sprite (302/304) from FIGS. 1A and 2A, the "OK button" sprite (306/308) from FIGS. 1B and 2B, or even other entities, such as the envelope sprite (310) and the phone sprite (312). As may now be understood, the execution of the entity agnostic version of the "BIG_JUMP" animation will animate each of the different entities through the same animation steps. As is also shown in FIG. 3, one of the parameters passed to the entity agnostic version of the "BIG_JUMP" animation may include a "TIME" factor, indicating the amount of time that a given entity wishes the animation to last. As shown in the pseudocode of the exemplary routine of entity agnostic "BIG_JUMP" animation 300, the "TIME" factor is evenly divided between the 'up' movement and the 'down' movement. This will have the effect of "scaling" the animation for the appropriate time span, e.g., entities 302 and 306 are shown as using the animation with a 1.0 second time parameter (as in FIGS. 1A and 1B), and entities 304 and 308 are shown as using the animation with a 2.0 second time parameter (as in FIGS. 2A and 2B). Thus, across all the different entities and time scales, only a single, reference able version of the entity agnostic animation routine 300 needs to be stored. Of course, as will be explained in greater detail below, a programmer may also customize or edit the entity agnostic animation routine for the purposes of a particular scene or implementation, too.

Figure 4:
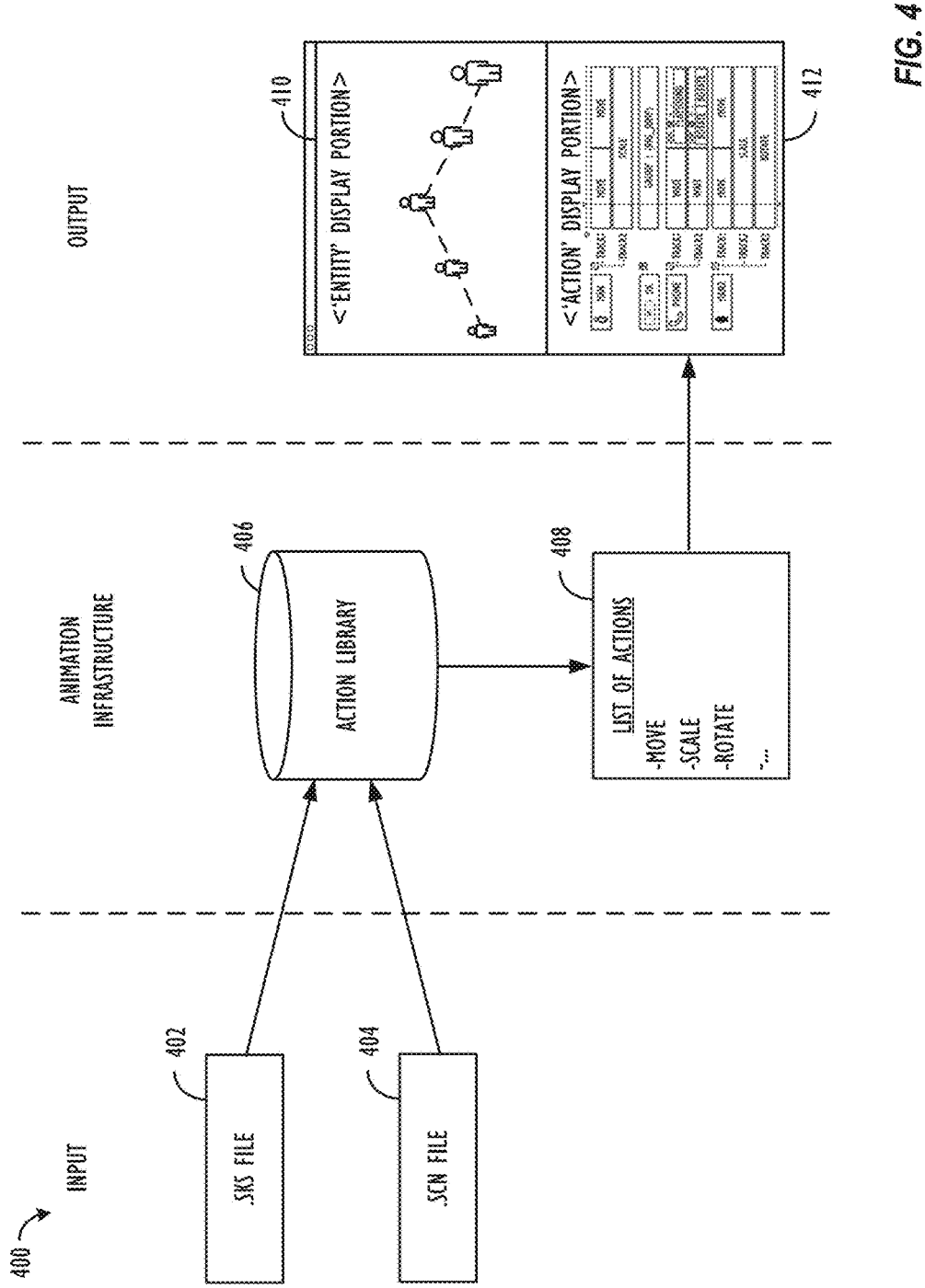
FIG. 4 illustrates an exemplary entity agnostic animation infrastructure framework, in accordance with one embodiment.

Referring now to FIG. 4, an exemplary entity agnostic animation infrastructure framework 400 is illustrated, in accordance with one embodiment. Beginning on the left-hand side of FIG. 4, the input to the entity agnostic animation tool may include "INPUT" files, such as an APPLE .sks file 402 (i.e., Sprite Kit file) or an APPLE .scn file 404 (i.e., SceneKit file). Of course, other file formats specifying the contents and animations of a graphical scene may be supported by the entity agnostic animation framework, as well.

Moving to the middle part of FIG. 4, the entity agnostic animation infrastructure framework may parse through the input files, creating a listing of all graphical entities and the animations associated with those entities and storing them in a repository, e.g., Action Library 406, wherein the actions will be agnostic of any particular editor or animation framework. Storing the reusable entity agnostic animations in an "editor agnostic" central repository such as Action Library 406 allows for the same animations to be applied to different graphical entities within the same scene, or even across different editor programs that have common access to the repository of common entity agnostic animations. For the particular project that a programmer is working on, the particular animation actions that are being applied to the entities in the particular project may be extracted, e.g., in the form of List of Actions 408. These actions may include: move, scale, rotate, delay, play_sound, apply_texture, change_texture, etc., and other common animation actions that may be defined by the animation framework. The list of actions may then be 'unpackaged' or 'de-serialized' and displayed to a user/programmer via an entity agnostic animation user interface that provides the programmer with a convenient way to visualize, modify, and synchronize the entity agnostic animations across the various entities within a scene.

As will be explained in further detail below, according to some embodiments, the entity agnostic animation user interface may comprise a first window portion (410) displaying a representation of one or more entity objects and their corresponding animations, and a second portion (412) that may simultaneously display a series of temporally non-overlapping animation action objects (e.g., from the aforementioned List of Actions 408) for each entity in the scene. The actions for the various entities in the scene may then be organized into a 'filmstrip' or 'timeline'-like arrangement, e.g., consisting of individual action groupings that will be referred to herein as "tracks" or "sequences," as well as track groupings that will be referred to herein as "groups." According to some embodiments, changes made by the programmer to the animations in window 412 may be visualized in near real-time as being applied to their respective entities in window 410.

Figure 5:
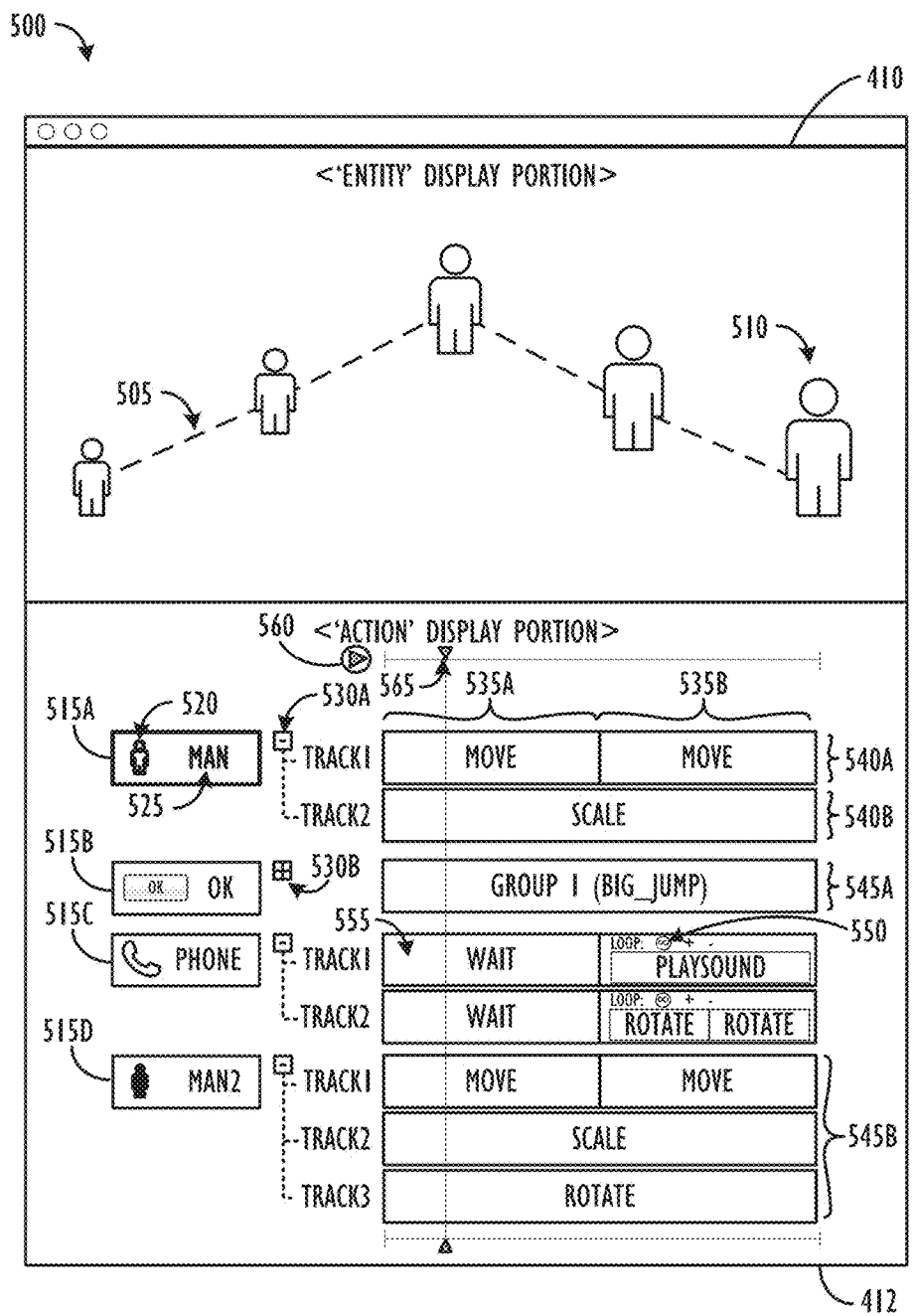
FIG. 5 illustrates an exemplary entity agnostic animation user interface, in accordance with one embodiment.

Referring now to FIG. 5, an exemplary entity agnostic animation user interface 500 is illustrated, in accordance with one embodiment. As mentioned above, the user interface 500 may comprise a first window portion (410) displaying a representation of one or more entity objects and their corresponding animations, and a second portion (412) that may simultaneously display a series of temporally non-overlapping animation action objects for each entity in the scene. In user interface 500, the entities 515A-515D are displayed in individual rows in the 'action' display portion 412 of the user interface 500. Each entity row 515 may comprise, e.g., a small icon or picture of the graphical entity 520 and the name of the entity 525. In the case of entity 515A, the entity name is, simply, "MAN." The names of the entities may also be changed or customized via interface 500. Also shown is icon 530, for expanding or collapsing the animation "group" for each individual entity, 515. Exemplary icon 530A is shown in the "expanded" position, revealing two "tracks," entitled "TRACK 1" (540A) and "TRACK2" (540B). Exemplary icon 530B is shown in the "collapsed" position, revealing a single "group" animation, entitled "GROUP 1 (BIG_JUMP)" (545A). Thus, if exemplary icon 530B were to be clicked by the programmer, the Track rows associated with entity 515B would look similar to the rows currently display as associated with entity 515A (since they both reflect the constituent parts of the entity agnostic "BIG_JUMP" animation). Exemplary group 545B shows an example of another expanded animation group. Group 545 reflects a modification to the "BIG_JUMP" animation, wherein the entity is also rotating (see "ROTATE" Track 3) during the performance of the "BIG_JUMP" animation. As mentioned above, the interface 500 provides the programmer with a convenient, and cross-editor compliant plug-in, i.e., service, for editing entity agnostic animations. For this reason, the service provided by interface 500 may also be referred to herein as "Animation As A Service" or "AAAS."

Turning now to a more detailed look at Track 1 540A of entity 515A, it may be seen that Track 1 540A is comprised of individual actions 535A and 535B, which, in this case, both happen to be "Move" actions. Moving down to the second Track "row" under entity 515A, Track 2 540B, it may be seen that there is a "Scale" action that visually spans the same amount of "time," and is concurrent with, the two "Move" operations 535A and 535B. As may now be more fully appreciated, the collection of animation tracks 540 implement the aforementioned "BIG_JUMP" animation on "Man" entity 515A. According to some embodiments, if a user selects entity 515A, the corresponding representation of the entity agnostic animation being applied to the entity may be displayed to the programmer in the 'Entity' display portion, e.g., window 410, of interface 500. As shown in FIG. 5, the animation for entity 515A is similar to the "BIG_JUMP" animation first introduced with FIG. 1A. The entity proceeds (in time) along movement path 505, and, by the end of the movement path, 510, has scaled to twice its original size. As demonstrated in interface 500, the scaling operation in Track 2 540B proceeds simultaneously with the two "Move" operations in Track 1 540A, meaning that the entity 515A may smoothly increase in size during the duration of the "BIG JUMP" animation, as is illustrated in window 410. Recall that, the overall duration of the animation may also be modified by the programmer, but the relative durations of the individual constituent actions may scale with the overall duration of the animation, in accordance with how they are specified in interface 500. According to other embodiments, an entity does not have to be specifically selected for its corresponding animation to appear in 'Entity' display portion window 410. Instead, by default, the animations for all entities, e.g., each of entities 515A-515D in the example of FIG. 5, may be shown simultaneously when the user/programmer either presses a "preview" button 560 (which causes the animations to play out in real-time, i.e., as they would in the final game/app). Alternatively, the user/programmer may manipulate a "timeline" slider 565 to view the result of the animations at a particular time index mark.

Other aspects of the animation objects may also be modified by the programmer via exemplary interface 500. For example, "Wait" operations (555) may be inserted into the various animation tracks and "dragged," e.g., via a mouse input device or a touch input, to the appropriate length of time for the particular animation. Further, "Loop" options (550) may also be available to the programmer, in order to cause an action (or set of actions, as is the case with the paired "Rotate" actions assigned to entity 515C), to be repeated for a finite, specified, number of iterations (e.g., using 'plus' and 'minus' buttons), or infinitely, i.e., as long as the scene is running. As may now be appreciated, if the animations for entities 515A and 515C are initiated at the same time, "Phone" sprite 515C will begin to repeatedly "PLAYSOUND" (e.g., a phone ringing sound) and "ROTATE" (e.g., back in forth in a first, and then a second, rotation direction) at the moment that the "Man" sprite 515A begins the 'descent' portion of his "BIG_JUMP." Because the Loops for entity 515C currently have the "infinite" option selected, the phone will continue to play a sound and rotate, even after the "Man" sprite 515A has completed his "BIG_JUMP" operation. Because interface 500 is provided as an "AAAS" plug-in to any existing integrated development environment (IDE), the entity agnostic animation tool described herein has cross-editor compliance and is not dependent on knowledge or use of any particular programming language or environment.

Figure 6:
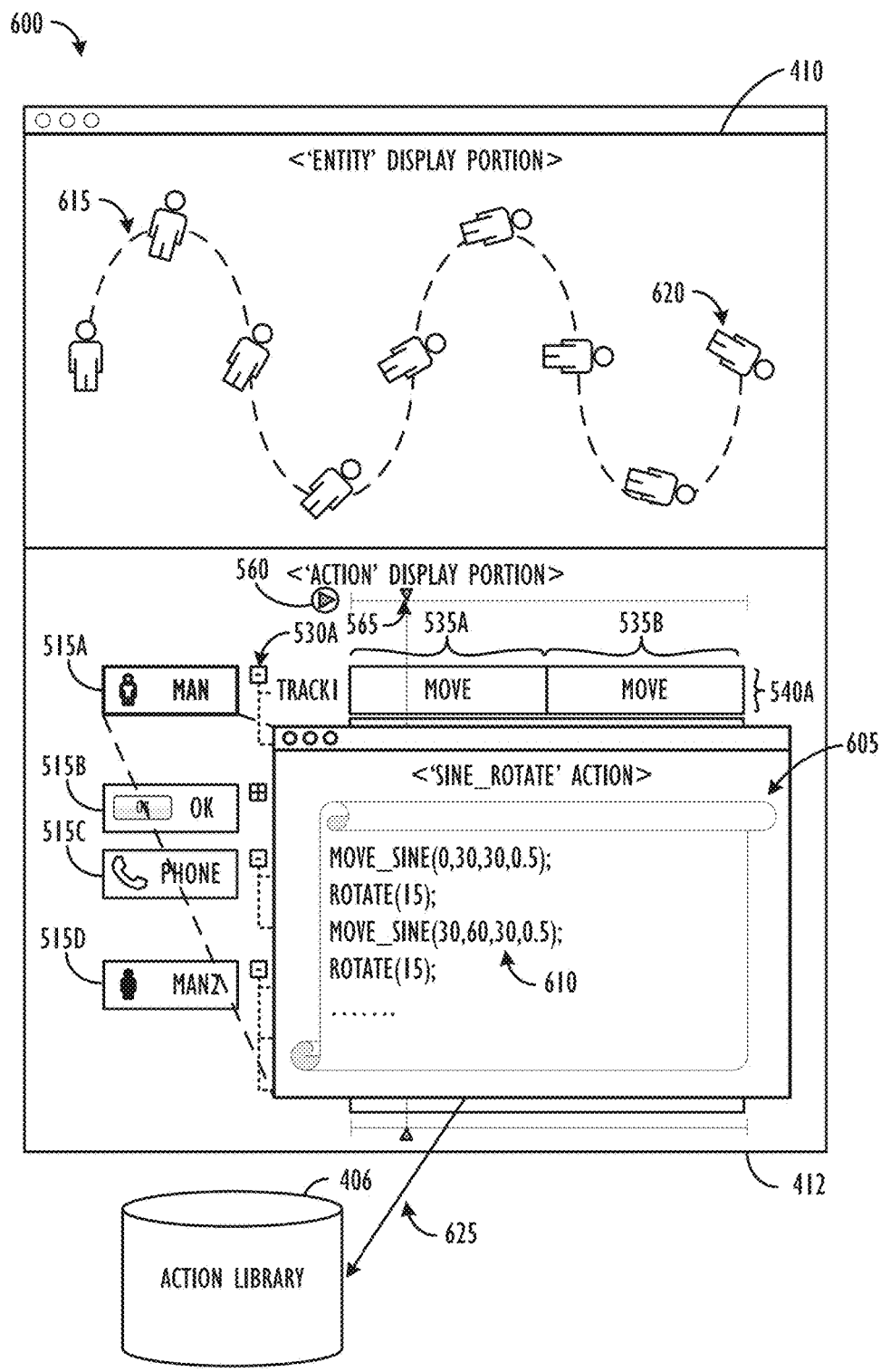
FIG. 6 illustrates an exemplary customizable entity agnostic animation user interface, in accordance with one embodiment.

Referring now to FIG. 6, an exemplary customizable entity agnostic animation user interface 600 is illustrated, in accordance with one embodiment. According to some embodiments, programmers may wish to create "custom" animation actions and/or modify existing animation actions, and then plug them in to be used with entities in their existing scenes/apps. For such "custom" animations, programmers may not want to be limited to the finite "building blocks" of animation provided by the animation infrastructure framework that they are working with (e.g., the move, rotate, and scale actions that have been described above). Instead, programmers may wish to develop customized animations in their coding language of choice. As such, according to some embodiments, the interface 600 may also provide the programmer with an animation customization editor 605 for writing custom programming blocks. Suppose that the programmer wishes to have "Man" entity 515A be animated as traveling according to a sine wave while rotating, and there isn't a fundamental action block that allows for this action via the editor user interface 600. In such a case, regardless of the programming language used to program the game/app, the programmer may use a programming language that compiles to bitcode (rather than machine code), e.g., the Swift programming language provided by APPLE INC, to code the behavior, e.g., by writing new program steps 610 for carrying out the desired customized animation. Such custom animations, if compiled to bitcode, could also then be written 625 to the action library 406, and then shipped and reused across different platforms and with different compilers. Animation customization editor 605 also allows the programmer to make and visualize the animation changes 'live,' i.e., as they are being inputted to the editor. According to some embodiments, the editor may be the Xcode IDE provided by APPLE INC., or other compatible IDE, and the animation changes may be visualized in window 410, as previously discussed with respect to FIG. 5.

In the example of FIG. 6, the entity 515A is shown as simultaneously rotating and moving along the new, custom 'sine wave' path (e.g., from position 615 to position 620) that is being written by the programmer in the animation customization editor 605, and that is referred to therein as the "SINE_ROTATE" animation. According to some embodiments, animation definitions may also include specified "entry" and "exit" behaviors for the entity to follow, e.g., "accelerate in," "decelerate it," "accelerate out," "decelerate out," etc., as is desired in a given implementation. Once stored in the action library 406, the custom "SINE_ROTATE" animation may then be applied and to other entities (e.g., the "OK Button," the "Phone," etc.), and may even be further manipulated (e.g., changing the time scale) when applied to such other entities, if so desired.

Figure 7:
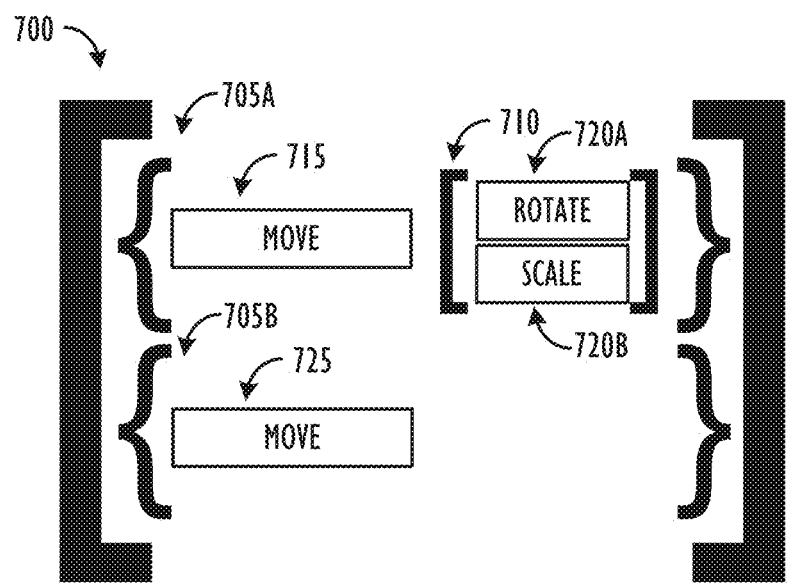
FIG. 7 illustrates an exemplary nested entity agnostic animation object, in accordance with one embodiment.

Referring now to FIG. 7, an exemplary nested entity agnostic animation object 700 is illustrated, in accordance with one embodiment. As illustrated in FIG. 7, the "nested" entity agnostic animation object 700 comprises two different animation tracks, 705A and 705B. Animation track 705A is, in turn, comprised of a "Move" animation object (715) and a nested animation track (710), which is, in turn, comprised of two different animation objects: "Rotate" (720A) and "Scale" (720B). Finally, the second animation track, 705B, is comprised of a single "Move" animation object (725). The nested, i.e., structured, representation of entity agnostic animation object 700 may occur, e.g., if the animation object is created programmatically, i.e., automatically, by some other program or framework. According to some embodiments, when de-serializing a nested animation object, the entity agnostic animation tool may proceed in a 'depth first' manner, i.e., going to the deepest level of each 'top-level' track in the animation object first, and creating asynchronous tracks for as many separately nested action objects as are nested in the track, before moving on to de-serialize other 'top-level' tracks packaged in the nested animation object in the same manner. According to some embodiments, the entity agnostic animation tool may also monitor other animation objects/files within the current workspace, and if the current de-serialized animation object/file has references to any of the external animation objects/files, the animation tool may also process those animation objects/files in the same de-serializing fashion before instancing them to the current "animation tree" displayed in window portion 412.

Figures 8A, 8B:
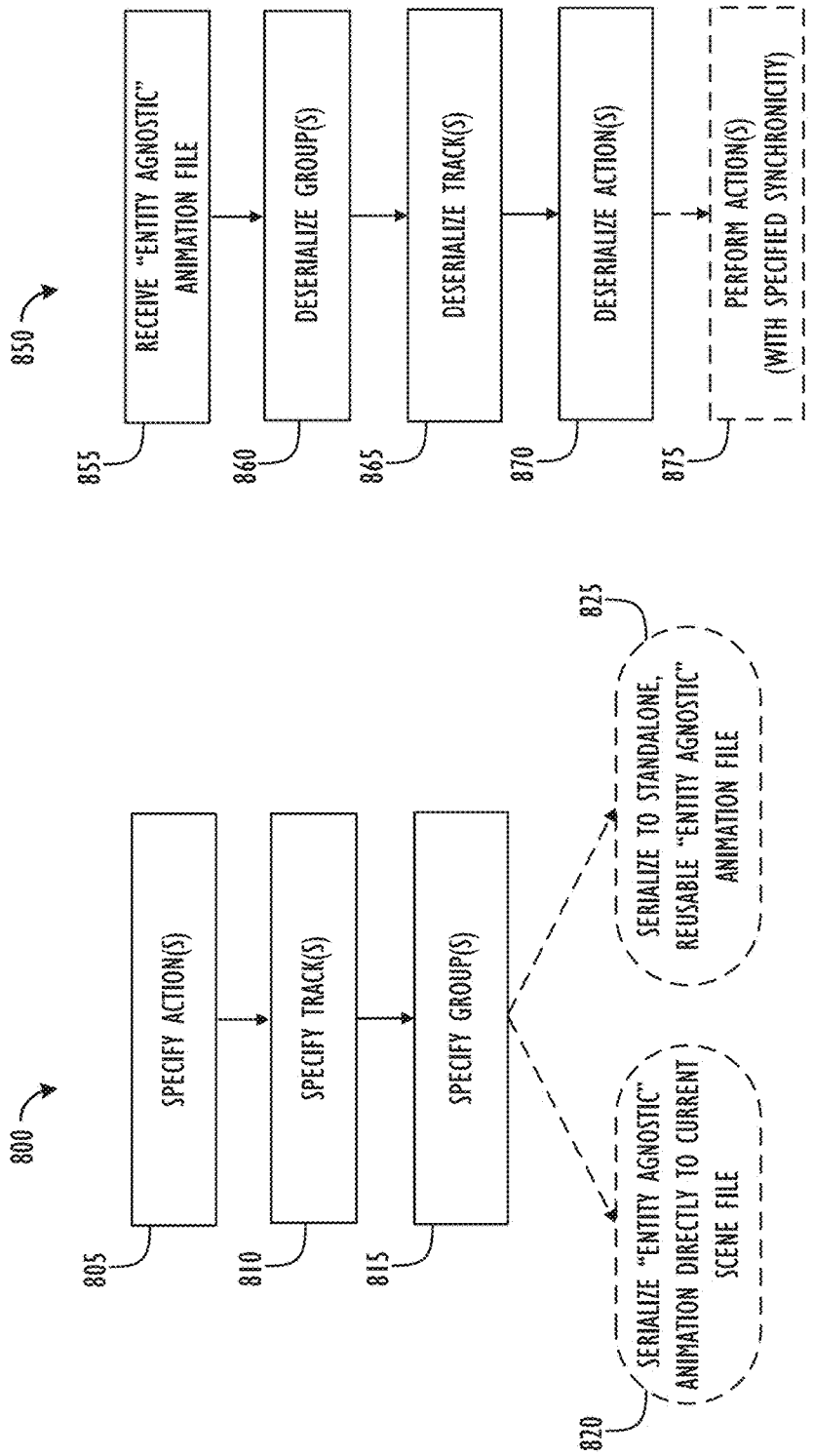
FIG. 8A illustrates, in flowchart form, an exemplary process for serializing an entity agnostic animation object, in accordance with one embodiment.
FIG. 8B illustrates, in flowchart form, an exemplary process for de-serializing an entity agnostic animation object, in accordance with one embodiment.

Referring now to FIG. 8A, an exemplary process 800 for serializing an entity agnostic animation object is illustrated in flowchart form, in accordance with one embodiment. First, the entity agnostic animation tool may allow a user (e.g., a programmer) to specify one or more animation actions that are to be applied to one or more graphical entities (Step 805). Next, the entity agnostic animation tool may allow the user to specify one or more "tracks" or "sequences," wherein each track comprises one or more sequential actions that are to be applied asynchronously (i.e., one after the other) to a particular graphical entity (Step 810). Next, the entity agnostic animation tool may allow the user to specify one or more "groups," wherein each group comprises one or more tracks that are to be applied synchronously (i.e., beginning and ending at the same time as each other) to a particular graphical entity (Step 815). Finally, the one or more entity agnostic animation groups specified by the programmer may be stored in a non-transitory memory in one of several manners. In one embodiment, the entity agnostic animation file may be serialized directly to the current scene file that the programmer is operating on (Step 820). In another embodiment, the entity agnostic animation file may be serialized to a stand-alone, reusable entity agnostic animation file that may be stored, e.g., in a commonly accessible library of animation files (Step 825).

Referring now to FIG. 8B, an exemplary process 850 for de-serializing an entity agnostic animation object is illustrated in flowchart form, in accordance with one embodiment. First, the entity agnostic animation tool may receive an entity agnostic animation file (Step 855). Next, the entity agnostic animation tool may de-serialize the one or more animation groups that comprise the entity agnostic animation file (Step 860). In this context, the term "de-serialize" is used to mean "unpack" the constituent components of the entity agnostic animation file, so that the individual action elements may be applied in the specified manner to the particular graphical entity that is attempting to execute the particular entity agnostic animation file. Next, the entity agnostic animation tool may de-serialize each of the one or more tracks in each of the one or more animation groups that comprise the entity agnostic animation file (Step 865). Next, the entity agnostic animation tool may de-serialize each of the one or more actions that comprise each of the one or more animation groups that comprise the entity agnostic animation file (Step 870). Finally, if so desired, the entity agnostic animation tool may perform the action(s) encoded within the entity agnostic animation file on the particular graphical entity that is attempting to execute the particular entity agnostic animation file (Step 875).

Figure 9:
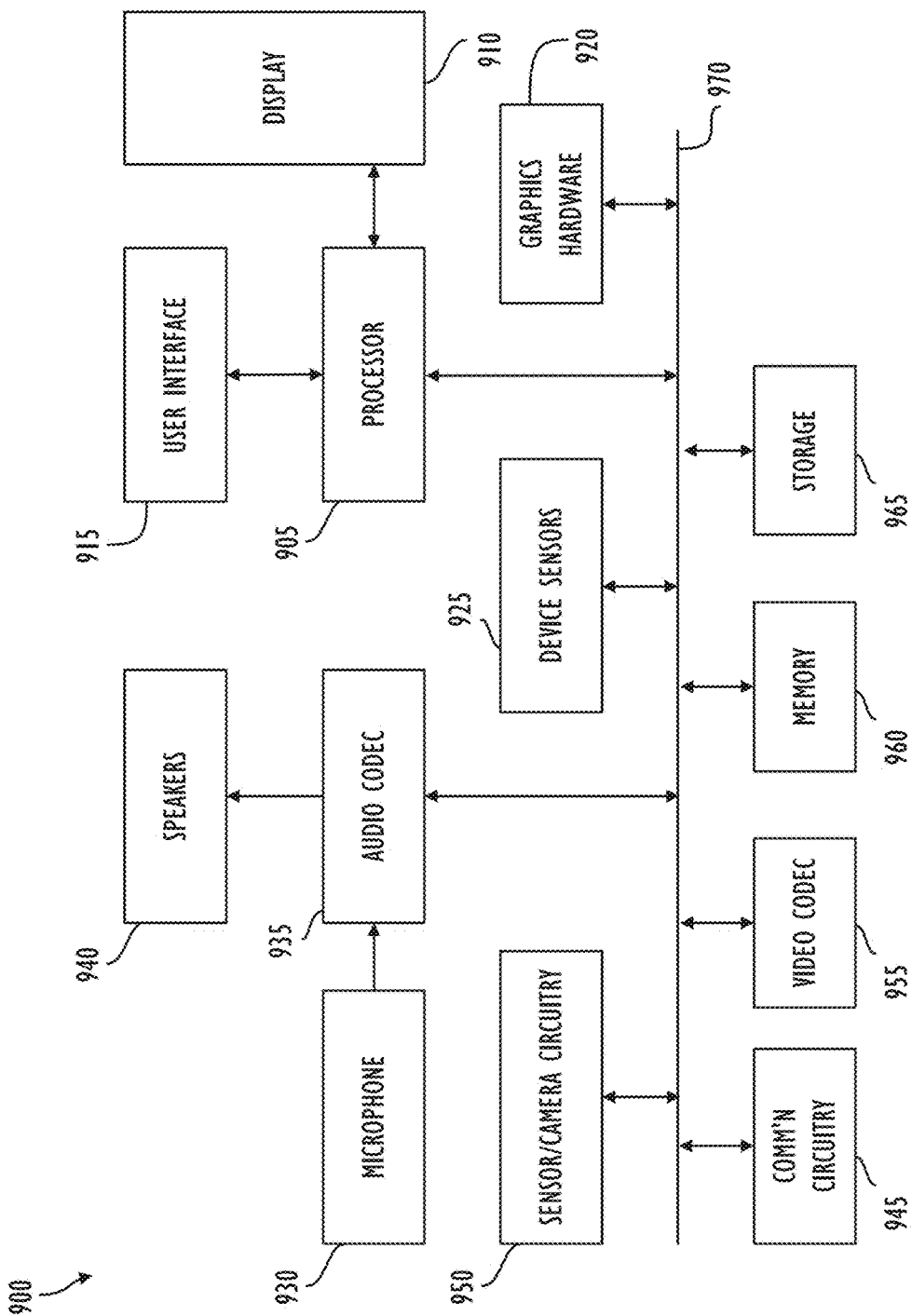
FIG. 9 illustrates a simplified functional block diagram of an illustrative electronic device, according to one embodiment.

Referring now to FIG. 9, a simplified functional block diagram of an illustrative electronic device 900 or "hosting device" is shown according to one embodiment. Electronic device 900 may include processor 905, display 910, user interface 915, graphics hardware 920, device sensors 925 (e.g., proximity sensor/ambient light sensor, accelerometer and/or gyroscope), microphone 930, audio codec(s) 935, speaker(s) 940, communications circuitry 945, digital image capture unit 950, video codec(s) 955, memory 960, storage 965, and communications bus 970. Electronic device 900 may be, for example, a personal digital assistant (PDA), personal music player, mobile telephone, or a notebook, laptop, or tablet computer system.

Processor 905 may be any suitable programmable control device capable of executing instructions necessary to carry out or control the operation of the many functions performed by device 900 (e.g., such as the processing of texture maps in accordance with operations in any one or more of the Figures). Processor 905 may, for instance, drive display 910 and receive user input from user interface 915 which can take a variety of forms, such as a button, keypad, dial, a click wheel, keyboard, display screen and/or a touch screen. Processor 905 may be a system-on-chip such as those found in mobile devices and include a dedicated graphics processing unit (GPU). Processor 905 may be based on reduced instruction-set computer (RISC) or complex instruction-set computer (CISC) architectures or any other suitable architecture and may include one or more processing cores. Graphics hardware 920 may be special purpose computational hardware for processing graphics and/or assisting processor 905 process graphics information. In one embodiment, graphics hardware 920 may include one or more programmable graphics processing units (GPUs).

Sensor and camera circuitry 950 may capture still and video images that may be processed to generate images, at least in part, by video codec(s) 955 and/or processor 905 and/or graphics hardware 920, and/or a dedicated image processing unit incorporated within circuitry 950. Images so captured may be stored in memory 960 and/or storage 965. Memory 960 may include one or more different types of media used by processor 905, graphics hardware 920, and image capture circuitry 950 to perform device functions. For example, memory 960 may include memory cache, read-only memory (ROM), and/or random access memory (RAM). Storage 965 may store media (e.g., audio, image and video files), computer program instructions or software, preference information, device profile information, and any other suitable data. Storage 965 may include one or more non-transitory storage mediums including, for example, magnetic disks (fixed, floppy, and removable) and tape, optical media such as CD-ROMs and digital video disks (DVDs), and semiconductor memory devices such as Electrically Programmable Read-Only Memory (EPROM), and Electrically Erasable Programmable Read-Only Memory (EEPROM). Memory 960 and storage 965 may be used to retain computer program instructions or code organized into one or more modules and written in any desired computer programming language. When executed by, for example, processor 905, such computer program code may implement one or more of the methods described herein.

Figure 10:
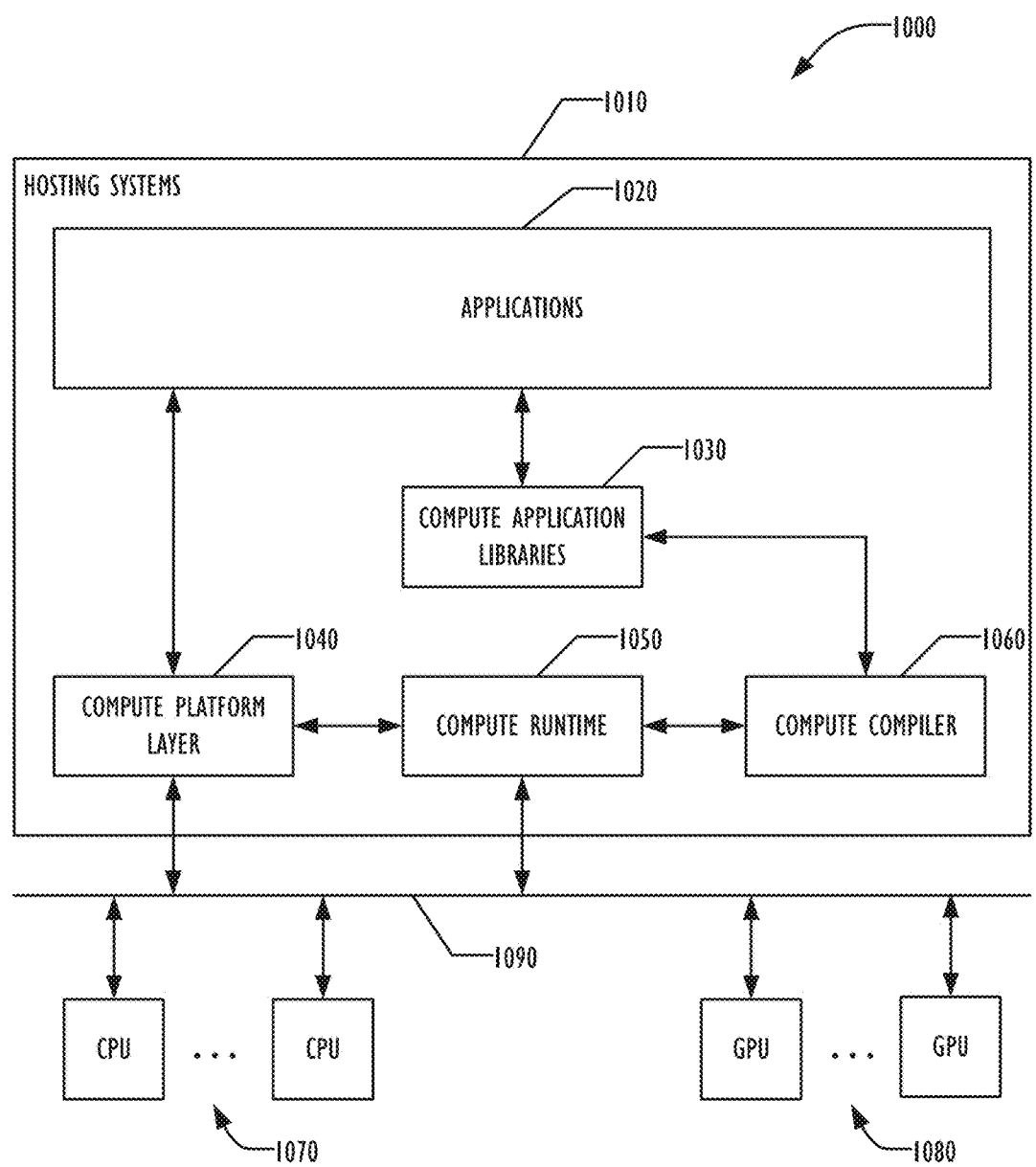
FIG. 10 is a block diagram illustrating one embodiment of a graphics rendering system.

FIG. 10 is a block diagram illustrating one embodiment of a graphics rendering system 1000 that uses computing devices including CPUs and/or GPUs to perform parallel computing for applications. System 1000 may implement a parallel computing architecture. In one embodiment, system 1000 may be a graphics system including one or more host processors coupled with one or more CPUs 1070 and one or more GPUs 1080 through a data bus 1090. The plurality of host processors may be networked together in a host system 1010. The plurality of CPUs 1070 may include multi-core CPUs from different vendors. A computer processing unit or compute unit, such as CPU or GPU, may be associated by a group of capabilities. For example, a GPU may have dedicated texture rendering hardware. Another media processor may be a GPU supporting both dedicated texture rendering hardware and double precision floating point arithmetic. Multiple GPUs may be connected together.

In one embodiment, the host systems 1010 may support a software stack. The software stack can include software stack components such as applications 1020, compute application libraries 1030, a compute platform layer 1040, e.g., an OpenCL platform, a compute runtime layer 1050, and a compute compiler 1060. An application 1020 may interface with other stack components through API calls. One or more processing elements or threads may be running concurrently for the application 1020 in the host systems 1010. The compute platform layer 1040 may maintain a data structure, or a computing device data structure, storing processing capabilities for each attached physical computing device. In one embodiment, an application may retrieve information about available processing resources of the host systems 1010 through the compute platform layer 1040. An application may select and specify capability requirements for performing a processing task through the compute platform layer 1040. Accordingly, the compute platform layer 1040 may determine a configuration for physical computing devices to allocate and initialize processing resources from the attached CPUs 1070 and/or GPUs 1080 for the processing task.

The compute runtime layer 1050 may manage the execution of a processing task according to the configured processing resources for an application 1020, for example, based on one or more logical computing devices. In one embodiment, executing a processing task may include creating a compute program object representing the processing task and allocating memory resources, e.g. for holding executables, input/output data etc. An executable loaded for a compute program object may be a compute program executable. A compute program executable may be included in a compute program object to be executed in a compute processor or a compute unit, such as a CPU or a GPU. The compute runtime layer 1050 may interact with the allocated physical devices to carry out the actual execution of the processing task. In one embodiment, the compute runtime layer 1050 may coordinate executing multiple processing tasks from different applications according to run time states of each processor, such as CPU or GPU configured for the processing tasks. The compute runtime layer 1050 may select, based on the run time states, one or more processors from the physical computing devices configured to perform the processing tasks. Performing a processing task may include executing multiple threads of one or more executables in a plurality of physical computing devices concurrently. In one embodiment, the compute runtime layer 1050 may track the status of each executed processing task by monitoring the run time execution status of each processor.

The runtime layer may load one or more executables as compute program executables corresponding to a processing task from the application 1020. In one embodiment, the compute runtime layer 1050 automatically loads additional executables required to perform a processing task from the compute application library 1030. The compute runtime layer 1050 may load both an executable and its corresponding source program for a compute program object from the application 1020 or the compute application library 1030. A source program for a compute program object may be a compute program source. A plurality of executables based on a single compute program source may be loaded according to a logical computing device configured to include multiple types and/or different versions of physical computing devices. In one embodiment, the compute runtime layer 1050 may activate the compute compiler 1060 to online compile a loaded source program into an executable optimized for a target processor, e.g., a CPU or a GPU, configured to execute the executable.

An online compiled executable may be stored for future invocation in addition to existing executables according to a corresponding source program. In addition, the executables may be compiled offline and loaded to the compute runtime 1050 using API calls. The compute application library 1030 and/or application 1020 may load an associated executable in response to library API requests from an application. Newly compiled executables may be dynamically updated for the compute application library 1030 or for the application 1020. In one embodiment, the compute runtime 1050 may replace an existing compute program executable in an application by a new executable online compiled through the compute compiler 1060 for a newly upgraded version of computing device. The compute runtime 1050 may insert a new executable online compiled to update the compute application library 1030. In one embodiment, the compute runtime 1050 may invoke the compute compiler 1060 when loading an executable for a processing task. In another embodiment, the compute compiler 1060 may be invoked offline to build executables for the compute application library 1030. The compute compiler 1060 may compile and link a compute kernel program to generate a computer program executable. In one embodiment, the compute application library 1030 may include a plurality of functions to support, for example, development toolkits and/or image processing, e.g., animation. Each library function may correspond to a computer program source and one or more compute program executables stored in the compute application library 1030 for a plurality of physical computing devices.

It is to be understood that the above description is intended to be illustrative, and not restrictive. The material has been presented to enable any person skilled in the art to make and use the invention as claimed and is provided in the context of particular embodiments, variations of which will be readily apparent to those skilled in the art (e.g., some of the disclosed embodiments may be used in combination with each other). In addition, it will be understood that some of the operations identified herein may be performed in different orders. The scope of the invention therefore should be determined with reference to the appended claims, along with the full scope of equivalents to which such claims are entitled.

The invention claimed is:

1. A non-transitory program storage device, readable by a programmable control device and comprising instructions stored thereon to cause one or more processing units to:
   obtain a scene file having one or more entity objects and a plurality of animation action objects uniquely associated with each entity object;
   identify a first entity object and a first collection of animation action objects, wherein the first collection of animation action objects: (i) includes all animation action objects associated with the first entity object, (ii) is separate from the first entity object, and (iii) represents a plurality of animation steps that define an entity object agnostic animation routine, wherein the first entity object is animated by referencing the entity object agnostic animation routine with a first parameter to apply the plurality of animation steps to the first entity object;
   display a window having a first portion and a separate second portion;
   display a representation of the first entity object in the first portion of the window;
   display a representation of a first series of temporally non-overlapping animation action objects from the first collection of animation action objects in a first track in the second portion of the window;
   generate a first action file that includes the first collection of animation action objects defining the entity object agnostic animation routine, wherein the first action file: (i) does not include the first entity object, and (ii) is configured to animate a second entity object referencing the entity object agnostic animation routine with a second parameter; and
   store the first action file in a non-transitory memory.

2. The non-transitory program storage device of claim 1, wherein the instructions stored on the programmable control device further cause the one or more processing units to animate the representation of the first entity object in the first portion of the window in real-time.

3. The non-transitory program storage device of claim 1, wherein the instructions stored on the programmable control device further cause the one or more processing units to display a representation of a second series of temporally non-overlapping animation action objects from the first collection of animation action objects in a second track in the second portion of the window,
   wherein the first track and the second track comprise a first group.

4. The non-transitory program storage device of claim 3, wherein the first group is displayed as a collapsible user interface element in the second portion of the window.

5. The non-transitory program storage device of claim 1, wherein the instructions stored on the programmable control device further cause the one or more processing units to modify at least one aspect of at least one of the animation action objects in the first track.

6. The non-transitory program storage device of claim 1, wherein the instructions that cause the one or more processing units to store the first action file further comprise instructions that cause the one or more processing units to store the first action file in another scene file.

7. The non-transitory program storage device of claim 1, wherein the instructions that cause the one or more processing units to store the first action file further comprise instructions that cause the one or more processing units to store the first action file in a standalone, reusable entity object agnostic animation file.

8. A system, comprising:
a non-transitory memory having, stored therein, computer program code; and
one or more processing units operatively coupled to the memory and display element and configured to execute instructions in the computer program code that cause the one or more processing units to:
obtain a scene file having one or more entity objects and a plurality of animation action objects uniquely associated with each entity object;
identify a first entity object and a first collection of animation action objects, wherein the first collection of animation action objects: (i) includes all animation action objects associated with the first entity object, (ii) is separate from the first entity object, and (iii) represents a plurality of animation steps that define an entity object agnostic animation routine, wherein the first entity object is animated by referencing the entity object agnostic animation routine with a first parameter to apply the plurality of animation steps to the first entity object;
display a window having a first portion and a separate second portion;
display a representation of the first entity object in the first portion of the window;
display a representation of a first series of temporally non-overlapping animation action objects from the first collection of animation action objects in a first track in the second portion of the window;
generate a first action file that includes the first collection of animation action objects defining the entity object agnostic animation routine, wherein the first action file: (i) does not include the first entity object, and (ii) is configured to animate a second entity object referencing the entity object agnostic animation routine with a second parameter; and
store the first action file in the non-transitory memory.

9. The system of claim 8, wherein the computer program code further comprises instructions that cause the one or more processing units to animate the representation of the first entity object in the first portion of the window in real-time.

10. The system of claim 8, wherein the computer program code further comprises instructions that cause the one or more processing units to display a representation of a second series of temporally non-overlapping animation action objects from the first collection of animation action objects in a second track in the second portion of the window,
wherein the first track and the second track comprise a first group.

11. The system of claim 10, wherein the first group is displayed as a collapsible user interface element in the second portion of the window.

12. The system of claim 8, wherein the computer program code further comprises instructions that cause the one or more processing units to modify at least one aspect of at least one of the animation action objects in the first track.

13. The system of claim 8, wherein the instructions in the computer program code that cause the one or more processing units to store the first action file further comprise instructions that cause the one or more processing units to store the first action file in another scene file.

14. The system of claim 8, wherein the instructions in the computer program code that cause the one or more processing units to store the first action file further comprise instructions that cause the one or more processing units to store the first action file in a standalone, reusable entity object agnostic animation file.

15. A computer-implemented method, comprising:
obtaining a scene file having one or more entity objects and a plurality of animation action objects uniquely associated with each entity object;
identifying a first entity object and a first collection of animation action objects, wherein the first collection of animation action objects: (i) includes all animation action objects associated with the first entity object, (ii) is separate from the first entity object, and (iii) represents a plurality of animation steps that define an entity object agnostic animation routine, wherein the first entity object is animated by referencing the entity object agnostic animation routine with a first parameter to apply the plurality of animation steps to the first entity object;
displaying a window having a first portion and a separate second portion;
displaying a representation of the first entity object in the first portion of the window;
displaying a representation of a first series of temporally non-overlapping animation action objects from the first collection of animation action objects in a first track in the second portion of the window;
generating a first action file that includes the first collection of animation action objects defining the entity object agnostic animation routine, wherein the first action file: (i) does not include the first entity object, and (ii) is configured to animate a second entity object referencing the entity object agnostic animation routine with a second parameter; and
storing the first action file in a non-transitory memory.

16. The computer-implemented method of claim 15, further comprising animating the representation of the first entity object in the first portion of the window in real-time.

17. The computer-implemented method of claim 15, further comprising displaying a representation of a second series of temporally non-overlapping animation action objects from the first collection of animation action objects in a second track in the second portion of the window,
wherein the first track and the second track comprise a first group.

18. The computer-implemented method of claim 15, further comprising modifying at least one aspect of at least one of the animation action objects in the first track.

19. The computer-implemented method of claim 15, wherein storing the first action file further comprises storing the first action file in another scene file.

20. The computer-implemented method of claim 15, wherein storing the first action file further comprises storing the first action file in a standalone, reusable entity object agnostic animation file.

* * * * *